J. NEFF, Jr.
Fruit-Gatherer.
No. 57,553.   Patented Aug. 28. 1866.
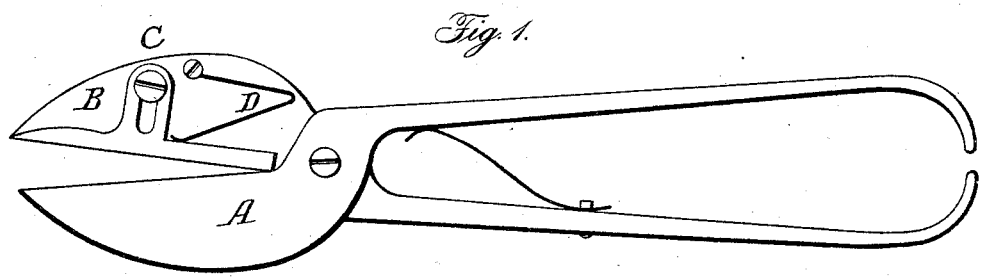
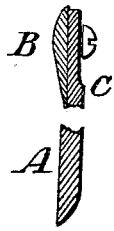
Witnesses:
John L. Lewis
Daniel J. Neff
Inventor:
John Neff. Jr

UNITED STATES PATENT OFFICE.

JOHN NEFF, JR., OF PULTNEY, NEW YORK.

IMPROVEMENT IN FRUIT-PICKERS.

Specification forming part of Letters Patent No. 57,553, dated August 28, 1866.

*To all whom it may concern:*

Be it known that I, JOHN NEFF, Jr., of Pultney, in the county of Steuben and State of New York, have invented a new and useful Improvement in Fruit-Pickers; and I do hereby declare that the following is a full, clear, and exact description of the construction and operation of the same, reference being had to the annexed drawings, making a part of this specification, in which—

Figure 1 is a side view. Fig. 2 is a transverse section of the blades.

The letters of reference refer to the same parts in each figure.

A is one of the blades. It is provided with a handle of any ordinary construction, and the size and shape may be varied to suit the hands or fancy of those that use them. It has a groove made parallel with the edge, as shown in Fig. 2. This groove is made to cause the fruit to be held more securely when the stems are hard, such as grape-stems. B is the other blade, made in shape and size to correspond with the blade A. It must be wide or large enough to have the griper C placed upon it, also the spring D, as shown in Fig. 1. These blades cut together as shears, and are used to cut off the fruit-stems.

C is the griper. It is made in shape as shown in Fig. 1. It must be as long as the blades on their cutting parts, and the edge that fits upon the blade A is grooved, as shown in Fig. 2. It has a flat projection with an elongated hole through for a screw to hold it upon the blade B, and the hole is thus made to allow it to suit the various-sized stems to which it may be applied.

D is a spring. (Shown in Fig. 1.) It is made to act upon the griper C, first, for the purpose of causing it to hold to any-sized stem, and by thus acting upon the griper it will also open the blades, so that no other spring is required.

To use my invention, apply the picker to the stem of the fruit with the side that has the griper next to the fruit. Then close the blade with the hand, and you have the stem cut off and the fruit held by the instrument until the blades are opened.

Having thus fully described my invention, what I claim as new, and desire to secure by Letters Patent, is—

The blades A and B, when made substantially as specified, also the griper C and spring D, when made and applied as specified, and used for the purpose set forth.

JOHN NEFF, JR.

Witnesses:
 JOHN L. LEWIS,
 DANIEL I. NEFF.